Feb. 5, 1957 G. H. GLOSS 2,780,523
PROCESS FOR RECOVERING SOLID CALCIUM FLUORIDE CONTAINING
PRODUCT AND COLLOIDAL SILICA SOLUTION FROM A
WEAK AQUEOUS FLUOSILICIC ACID SOLUTION
Filed March 22, 1954
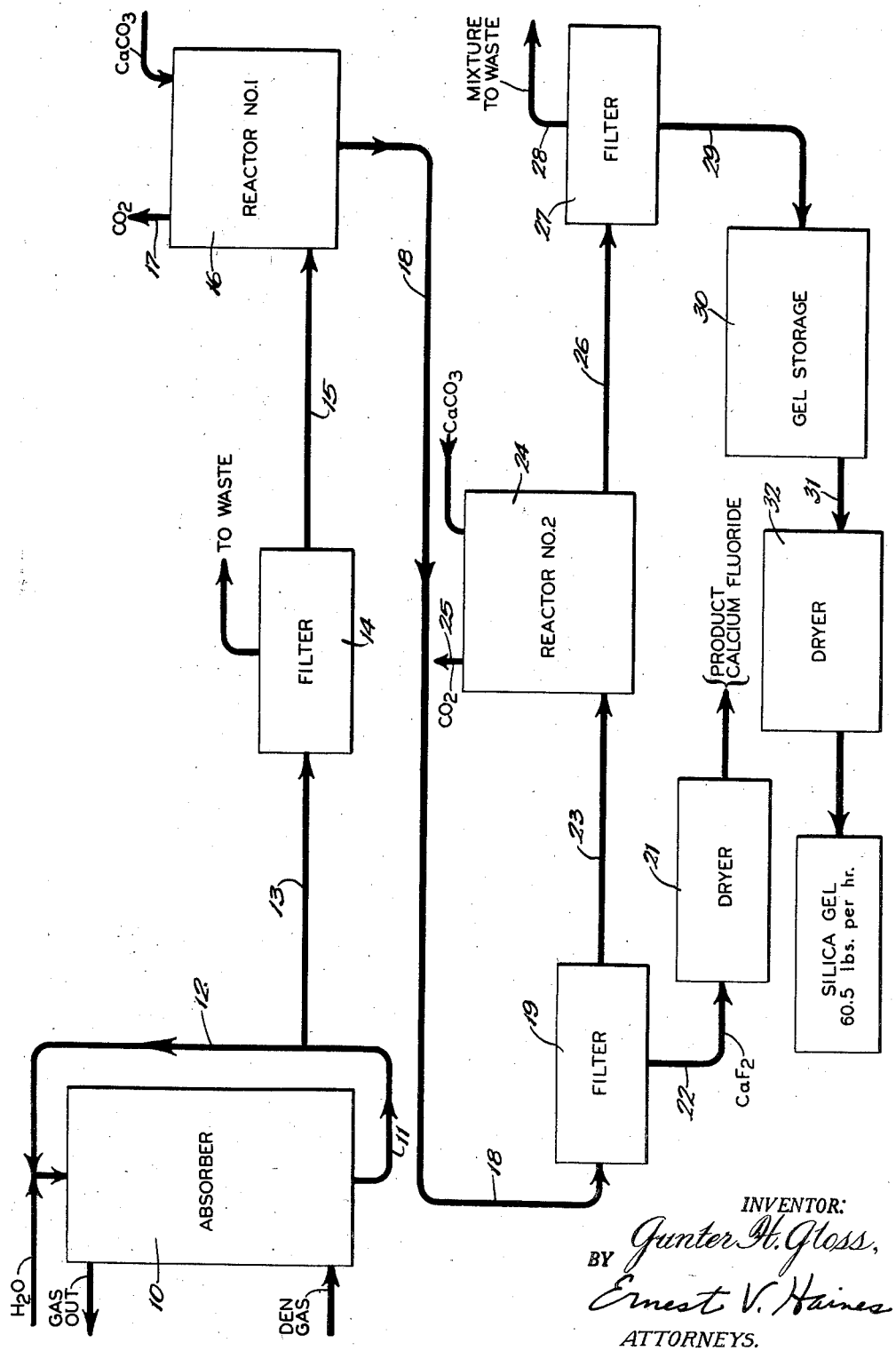
INVENTOR:
Gunter H. Gloss,
BY
Ernest V. Haines
ATTORNEYS.

United States Patent Office

2,780,523
Patented Feb. 5, 1957

---

2,780,523

PROCESS FOR RECOVERING SOLID CALCIUM FLUORIDE CONTAINING PRODUCT AND COLLOIDAL SILICA SOLUTION FROM A WEAK AQUEOUS FLUOSILICIC ACID SOLUTION

Gunter H. Gloss, Libertyville, Ill., assignor to International Minerals & Chemical Corporation, a corporation of New York Application March 22, 1954, Serial No. 417,723

10 Claims. (Cl. 23—88)

This invention relates to the production of fluoride chemicals. More particularly it relates to a process for the manufacture of calcium fluoride and silica gel from waste gases.

Large quantities of waste gases containing hydrofluoric acid and/or silicon tetrafluoride are evolved in many industrial operations and present a serious disposal problem. Atmospheric pollution is due not only to the presence of hydrofluoric acid, but also to the presence of silicon tetrafluoride, which in contact with moisture readily hydrolyzes to yield quantities of fluosilicic acid.

Manufacture of fluorides commercially has in general been limited to continuously neutralizing basic solutions with aqueous or anhydrous hydrofluoric acid. Calcium fluoride has been produced by absorbing hydrofluoric acid on dry oolitic or pesolitic limestones, or by neutralizing aqueous hydrofluoric acid with precipitated calcium carbonate. These methods all involve the use of relatively pure hydrofluoric acid for a neutralization reaction.

Recovery of fluorine from waste gases has been carried out by washing out the water soluble constituents of gases in an absorber. Such absorber treatments produce only a dilute solution of fluosilicic acid and such dilute solutions have not in general been adaptable to the manufacture of pure fluoride chemicals. Aqueous acid solutions prepared in an absorber have been treated with sodium chloride or calcium chloride to precipitate either sodium fluosilicate or calcium fluosilicate. When the aqueous acid solution has been treated with calcium carbonate as a substitute for calcium chloride, the product generally has been a mixed precipitate of calcium fluoride, calcium fluosilicate and silica.

In a copending application by Charles A. Butt, Serial No. 417,965 filed of even date herewith, there is shown a process for neutralizing fluosilicic acid solutions with calcium carbonate and separately recovering calcium fluoride and silica gel. The calcium fluoride product recovered in this system is not pure, however, and generally carries with it about 4% to about 7% by weight of silica.

A principal difficulty in carrying out the processes above described has been the precipitation of calcium fluoride in a manner which permits recovery of economic quantities of pure calcium fluoride meeting the specifications for commercial fluorspars of less than 1.5% $SiO_2$. In addition to the above shortcoming, processes which fail to precipitate the calcium fluoride and silica separately in general bring down a gelatinous or flocculent precipitate which presents filtering problems.

It is a primary object of this invention, therefore, to overcome the difficulties and shortcomings of processes heretofore in use.

It is another object of this invention to precipitate calcium fluoride in a manner permitting recovery of a calcium fluoride product containing less than about 0.5% silica on a dry basis.

It is still a further object of this invention to recover a commercially acceptable silica gel as well as calcium fluoride.

These and other objects of the invention will become apparent to those skilled in the art from a reading of the following description.

Briefly, this process consists in first producing a solution of fluosilicic acid as by absorbing fluorine-containing gases in an absorber which utilizes aqueous materials as the scrubbing medium. The aqueous acidic solution from the absorber is reacted in two stages with basic alkaline earth compounds capable of forming fluorides of relatively low solubility in aqueous media. In the first stage, calcium carbonate is added in amounts up to approximately 85% of the stoichiometric equivalent requirements for complete reaction between fluosilicic acid and calcium carbonate. After removal of the precipitated solids the remainder of the calcium carbonate necessary for complete reaction is added to the filtrate. Upon removal of the second precipitate, the substantially fluorine-free solution is treated to remove free water and give a pure silica gel product.

In more detail, if the fluorine-containing gases are a by-product of the manufacture of phosphoric acid or phosphate fertilizers, the den gases are passed through an absorber where the fluorine-bearing constituents of the gases are scrubbed out by an aqueous medium such as water or aqueous fluosilicic acid solution. In order to remove phosphate dust the gases can first be passed through a scrubber where they are contacted with saturated fluosilicic acid, sulfuric acid, or phosphoric acid, as shown in copending application Serial No. 398,866, Gunter H. Gloss and John H. Gross, inventors, filed December 17, 1953, entitled, "Production of Fluorine Compounds."

The aqueous acidic effluent solution from the absorber is controlled to have a fluosilicic acid concentration of between about 2½% $H_2SiF_6$ and about 3.8% $H_2SiF_6$ with concentrations in the range of about 3% to about 3.5% $H_2SiF_6$ preferred.

If the acid concentration exceeds about 4% in the instant process the $SiO_2$ content of the $CaF_2$ product increases rapidly and the filterability of the solution drops off rapidly. Before addition of calcium carbonate, the fluosilicic acid solution from the scrubber is treated to remove any solids or precipitated silica as by filtering, settling and decantation or an equivalent operation.

Aqueous acidic solution is next reacted in a first precipitation stage with finely divided calcium carbonate in amounts giving a mole ratio not exceeding 85% of the stoichiometric amount for complete reaction, i. e., 85% of the amount necessary to give the ratio 1 mole $H_2SiF_6$ to 3 moles $CaCO_3$. In general the first addition may vary 40% to 80% of the stoichiometric amount, depending upon the calcium fluoride recovery and purity desired. The purity of the product obtained after 80% addition when dried at 110° C. will have a calcium fluoride content of 92–93%. By calcination, the residual water and carbon dioxide can be driven off and the resultant product has a purity of 97–99% calcium fluoride.

The time of addition of calcium carbonate plus holding time may vary from about 30 minutes to about 2 hours duration. Either addition of amounts of $CaCO_3$ in excess of 85% or longer reaction times are to be avoided, since both increase the amount of co-precipitated hydrous-silica in the calcium fluoride product. The length of the reaction time in this first stage varies depending upon the duration of the reaction time permitted in the second stage as discussed subsequently.

In general the lower the temperature of the reacting mixture, the higher is the purity of calcium fluoride, other variables being held constant. A reaction temperature between about 35° F. and about 100° F. or higher can be used, but temperatures in the range of about 60° F. to about 90° F. are preferred because while calcium fluoride purity goes down as the reaction temperature is increased, the rate of change of purity is small by comparison with the change in filtration rate.

Solution from the first stage reaction is treated with the balance of the stoichiometric amount of calcium carbonate or preferably with an amount giving a slight excess of calcium carbonate such that a pH in the range of about 7 to about 7.3 is obtained in the final solution.

Temperatures are maintained at approximately the same level in the second stage of reaction as in the first stage. Reaction time in this second stage, however, must be subject to closer control if filtration problems are to be avoided. The overall reaction time for both of the reaction stages should generally not exceed 3 hours and preferably not exceed a total of 2 hours. The longer the reaction time permitted in the first stage, the shorter is the allowable reaction time in the second stage.

The second stage reaction results in the precipitation of a mixture of calcium fluoride and calcium silicofluoride. After the removal of this mixed precipitate, the resultant filtrate is concentrated by suitable means such as low temperature evaporation and drying.

The process will be further explained by reference to the flow sheet illustrating but one embodiment of the invention, in which den gases from a source not shown are passed counter-current to liquid in an absorber indicated by the numeral 10. Aqueous medium plus absorbed gases are withdrawn from the absorber 10 in the form of aqueous acidic solution through conduit 11. A part of the liquid is returned through conduit 12 to the top of the absorber where it is mixed with fresh water from a source not shown. The balance of the aqueous acidic solution is diverted through conduit 13 to filter station 14 where precipitated silica and miscellaneous solid impurities are removed. The filtrate from filter station 14 is passed through conduit 15 to a reactor 16 where with agitation the solution is mixed with the first charge of calcium carbonate. Carbon dioxide that is evolved by the reaction is discharged from the reactor through vent 17. Slurry from the reactor is pumped through conduit 18 to a filter station 19 where a substantially pure calcium fluoride cake 20 is separated. Calcium fluoride cake 20 is conveyed from filter 19 to a dryer 21 by suitable means 22 such as a moving belt. Filtrate from filter station 19 is pumped through conduit 23 to the second reactor 24. In this reactor the balance of calcium carbonate is added and the carbon dioxide evolved is discharged through vent 25. Slurry from reactor 24 is delivered through conduit 26 to filter station 27. Filter cake from station 27 is delivered by a suitable conveyor 28 to a storage station for further processing. The filtrate from filter station 27 is pumped through conduit 29 to storage vessel 30 where the colloidal solution is allowed to "gel." The gel is delivered by means of conveyor 31 to drying facilities 32 from which is obtained the dry silica gel product.

The following example is given by way of further explanation and without any intention of limiting the invention thereto.

*Example I*

Florida phosphate rock and sulfuric acid mixed in proportions to produce ordinary superphosphate evolved den gases which when passed through an absorber counter-current to fresh water added to the circuit produced an effluent liquid totaling approximately 5000 parts by weight and analyzing approximately 3.5% $H_2SiF_6$. Approximately 5000 parts by weight of this solution when treated with approximately 290 parts by weight of calcium carbonate, addition being made over a period of 1 hour, evolved approximately 127 parts by weight of carbon dioxide. The slurry formed by this reaction contained approximately 4.35% by weight of suspended $CaF_2$, while the aqueous phase contained 0.68% of residual $H_2SiF_6$ and 1.1% of colloidal silica. The slurry from this reaction vessel was filtered and 225 parts by weight of cake recovered which upon drying at 300° F. analyzed 92% $CaF_2$ and 0.52% $SiO_2$. The filtrate from this first filter operation when treated in reactor No. 2 with 156 parts by weight of calcium carbonate evolves approximately 32 parts by weight of carbon dioxide. Filtration of the slurry from the reactor No. 2 yields approximately 59 parts by dry weight of cake consisting predominantly of calcium fluoride and calcium silicofluoride. Filtrate obtained in this second filtration operation analyzes approximately 1% to 2% $SiO_2$. After gelation and drying at 550° C. this product had the following composition:

| | Percent |
|---|---|
| $SiO_2$ | 88.05 |
| F | 0.00 |
| Ca | 0.35 |
| $CO_2$ | 0.42 |
| Combined $H_2O$ | 11.15 |

Having thus described my invention, what I claim is:

1. A process for the production of fluorine-containing compounds which comprises reacting an aqueous fluosilicic acid solution containing less than 4% $H_2SiF_6$ with an amount of finely divided calcium carbonate which is less than about 85% of the stoichiometric equivalent required for neutralization of the $H_2SiF_6$ content, recovering a calcium fluoride solid product from a first solution containing colloidal silica, neutralizing said first solution with an added quantity of calcium carbonate, which will produce a second solution having a pH in the range of between about 7 and about 7.3, and separately recovering a second calcium fluoride-containing solid product and a second solution containing colloidal silica.

2. A process for recovering fluorides from gases containing the same, which comprises scrubbing said gases with aqueous medium to recover an acidic solution containing between about 2.5% and about 3.8% $H_2SiF_6$, reacting said solution with an amount of finely divided calcium carbonate which is less than about 85% of the stoichiometric equivalent required for neutralization of the $H_2SiF_6$ content, recovering a calcium fluoride solid product from a first solution containing colloidal silica, neutralizing said first solution with an added quantity of calcium carbonate and separately recovering a second calcium fluoride-containing solid product and a second solution containing colloidal silica.

3. A process as in claim 2 in which the second solution containing colloidal silica is concentrated and silica gel is recovered therefrom.

4. A process for recovering fluorides from gases containing the same which comprises scrubbing gases with aqueous medium to recover an acidic aqueous solution containing between about 3 and about 3.5% $H_2SiF_6$, reacting said aqueous acidic solution with an amount of finely divided calcium carbonate which is less than about 85% of the stoichiometric equivalent required for neutralization of the $H_2SiF_6$ content, recovering a calcium fluoride solid product from a first solution containing colloidal silica, neutralizing said first solution with an added quantity of calcium carbonate, separately recovering a second calcium fluoride-containing solid product and a second solution containing colloidal silica, concentrating the second solution and recovering silica gel therefrom.

5. A process for the production of fluorine-containing compounds which comprises reacting an aqueous fluosilicic acid solution containing less than 4% $H_2SiF_6$ at a temperature between about 35° F. and about 100° F. with an amount of finely divided calcium carbonate which constitutes between about 40 and about 80% of the stoichiometric equivalent required for neutralization of the $H_2SiF_6$ content, recovering a calcium fluoride solid product from a first solution containing colloidal silica, neutralizing said first solution with an added quantity of calcium carbonate, and separately recovering a second calcium fluoride-containing solid product and a second solution containing colloidal silica.

6. A process for the production of fluorine-containing compounds which comprises reacting an aqueous fluosilicic acid solution containing less than 4% $H_2SiF_6$ at a temperature in the range between about 60° F. and about 90° F. with an amount of finely divided calcium carbonate which is less than about 85% of the stoichiometric equivalent required for the neutralization of the $H_2SiF_6$ content, recovering a calcium fluoride solid product from a first solution containing colloidal silica, neutralizing said first solution with an added quantity of calcium carbonate sufficient to produce a second solution having a pH in the range between about 7 and about 7.3, and separately recovering a second calcium fluoride-containing solid product and a second solution containing colloidal silica.

7. A process as in claim 6 wherein the second solution containing colloidal silica is concentrated and silica gel is recovered therefrom.

8. A process for the production of fluorine-containing compounds which comprises reacting an aqueous fluosilicic acid solution containing between about 2.5% and about 3.8% $H_2SiF_6$ over a period in the range of between about 30 minutes and about two hours with an amount of finely divided calcium carbonate which is less than about 85% of the stoichiometric equivalent required for neutralization of the $H_2SiF_6$, recovering a calcium fluoride solid product from a first solution containing colloidal silica, neutralizing said first solution with calcium carbonate in excess of the stoichiometric equivalent required for completing neutralization of the $H_2SiF_6$ over a period of time such that the total of reaction times for the first neutralization and the second neutralization is less than 3 hours, separately recovering a second calcium fluoride-containing solid product and a second solution containing colloidal silica.

9. A process for the production of fluorine-containing compounds which comprises scrubbing den gases produced by the reaction of phosphate rock with sulfuric acid in the manufacture of superphosphate with aqueous medium to produce an aqueous effluent containing between about 2.5 and about 3.8% fluosilicic acid, reacting said solution with between about 40 and about 80% of the stoichiometric equivalent required for neutralization of the $H_2SiF_6$, filtering the slurry to recover a calcium fluoride cake and a first solution containing colloidal silica, neutralizing the said first solution with additional calcium carbonate in an amount sufficient to produce a solution having a pH between about 7 and about 7.3, filtering the slurry and separately recovering a calcium fluoride-calcium silicofluoride precipitate and a second filtrate containing colloidal silica.

10. A process as in claim 9 wherein the second filtrate is evaporated and silica gel recovered therefrom.

References Cited in the file of this patent

UNITED STATES PATENTS

| | | |
|---|---|---|
| 1,456,594 | Howard | May 29, 1923 |
| 2,385,208 | Jones | Sept. 18, 1945 |
| 2,447,359 | Oakley | Aug. 17, 1948 |
| 2,573,704 | Gilbert et al. | Nov. 6, 1951 |
| 2,584,894 | MacIntire | Feb. 5, 1952 |
| 2,702,233 | Mitchell et al. | Feb. 15, 1955 |

OTHER REFERENCES

"Fluorine Control and Recovery," by D. D. Morris, B. P. Sutherland and C. H. Wright, Canadian Chem. and Metallurgy, August 1937, pages 271–273.